United States Patent [19]

Pitruzzello

[11] 4,317,135

[45] Feb. 23, 1982

[54] FOCUS DETECTION CIRCUITRY

[75] Inventor: Michael C. Pitruzzello, Huntsville, Ala.

[73] Assignee: The United States of America as represented by the Secretary of the Army, Washington, D.C.

[21] Appl. No.: 183,608

[22] Filed: Sep. 2, 1980

[51] Int. Cl.³ .............................................. H04N 5/14
[52] U.S. Cl. .................................................... 358/227
[58] Field of Search ............................... 358/225, 227

[56] References Cited

U.S. PATENT DOCUMENTS

| | | | |
|---|---|---|---|
| 2,838,600 | 6/1958 | Salinger | 358/227 |
| 3,211,831 | 10/1965 | Steiner | 358/227 |
| 3,538,334 | 11/1970 | Shaffer, Jr. | 358/227 X |
| 3,621,136 | 11/1971 | Stanwood | 358/227 |

Primary Examiner—Robert L. Richardson
Attorney, Agent, or Firm—Nathan Edelberg; Robert P. Gibson; Freddie M. Bush

[57] ABSTRACT

The focus meter is an electronic circuit that is responsive to a video signal input to provide an output signal which indicates the degree of focus on a target. Imaging systems require alignment or focusing of the imaging sensor aimed or directed toward a target. The image sensor is aimed at the target and the degree of focus on the target is varied. As the maximum point of focus is reached a peak signal output results. The input video is coupled to an amplifier. The input signal is then processed through a differentiator to a peak detector. A portion of the signal is coupled from the amplifier to a sync separator circuit which causes a gate signal to be generated to an electronic switch during undesirable portions of the input video signal. This allows the differentiator output to be short-circuited to ground when undesirable signals are present. When the desired video lying between the blanking pulses are present, the differentiated signals are coupled to the detector. The detector measures the peak values. For a typical viewed scene wherein the target being tracked or sensed has reasonable detail, the peak detected value provides an easily measured maximum at the best point of focus.

8 Claims, 6 Drawing Figures

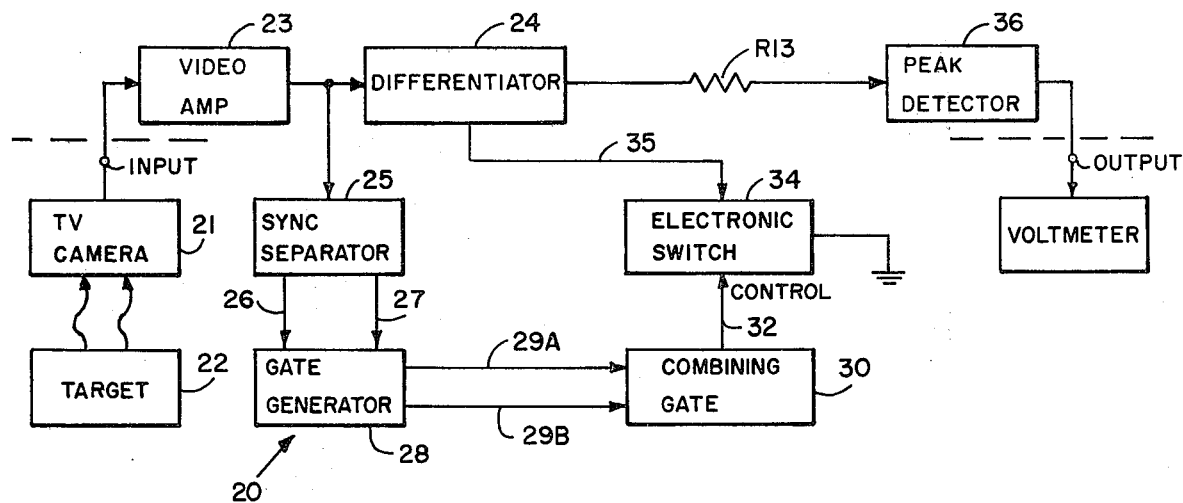
FIG. 1
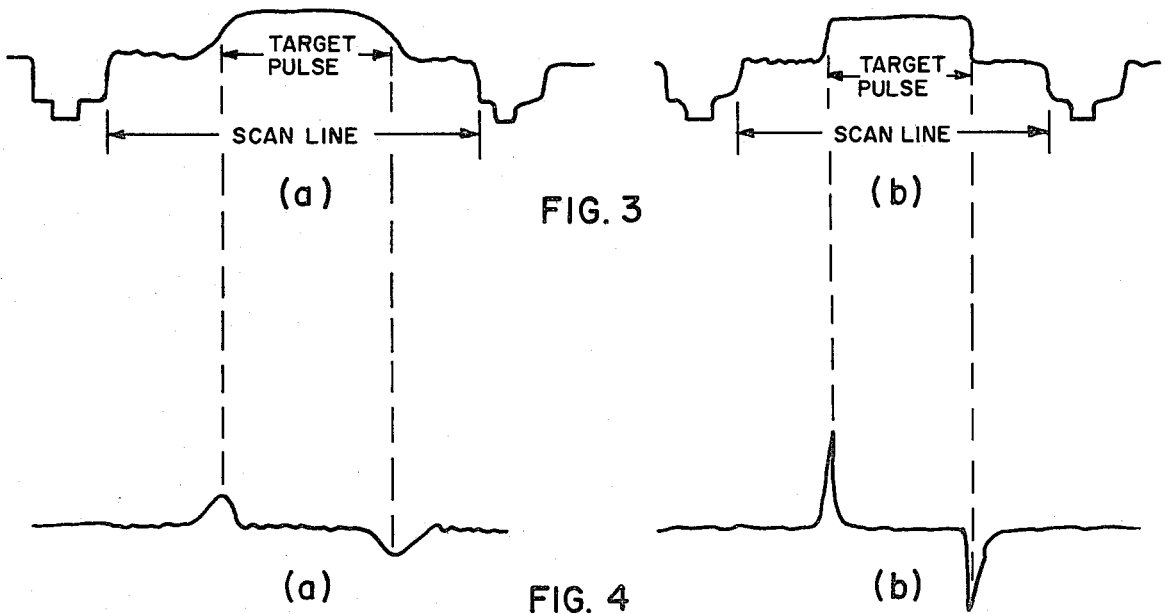
FIG. 3
FIG. 4

4,317,135

FOCUS DETECTION CIRCUITRY

DEDICATORY CLAUSE

The invention described herein may be manufactured, used, and licensed by or for the Government for governmental purposes without the payment to me of any royalties thereon.

BACKGROUND OF THE INVENTION

Prior art focus meter type devices have attempted to measure focus quality by measuring the amount of high spatial frequency content in a viewed scene. An inherent problem with this method lies in the fact that in scenes with a moderate or high detail content, the dynamic range necessary to make an accurate measurement near optimum focus is very difficult to attain. In the alignment of electro-optical systems containing a television (TV) or forward looking infrared (FLIR) sensor several steps are required by an operator relating to the focusing of the system optics and the focusing of the camera electron beam. These adjustments are usually done by a technician watching a TV image of a resolution chart and the results are somewhat subjective in nature.

SUMMARY OF THE INVENTION

Electro-optical imaging sensor systems such as television and forward looking infrared systems all require alignment or focusing of the system optics and electronics. The focus meter allows a technician or operator to observe a voltmeter and merely adjust system controls until a maximum voltage reading is obtained which corresponds to the best system focus. The focus meter is an electronic device which is responsive to input composite video from an electro-optical sensor and provides an output voltage indicative of the best possible electronic or optical focus for a system. The focus meter has a video amplifier input circuit coupled through a differentiator to a peak detector output circuit. A sync separator and gate generator are coupled to an electronic switch which controls whether or not the differentiator output is coupled to the peak detector. The meter measures the peak value of the differentiated video which lies between video blanking pulses. The peak value is easily measured with no dynamic range problems using standard components. For a viewed scene with any reasonable amount of detail this peak value reaches a well defined, easily measured maximum at best focus.

BRIEF DESCRIPTION OF THE DRAWINGS

FIG. 1 is a block diagram of a preferred embodiment of the focus meter.

FIGS. 3a and 3b are typical oscilloscope traces of a video signal of a target showing out of focus and best focus traces respectively.

FIGS. 4a and 4b are the respective derivative pulses of the significant portions of FIGS. 3a and 3b.

DESCRIPTION OF THE PREFERRED EMBODIMENT

Figure 2:
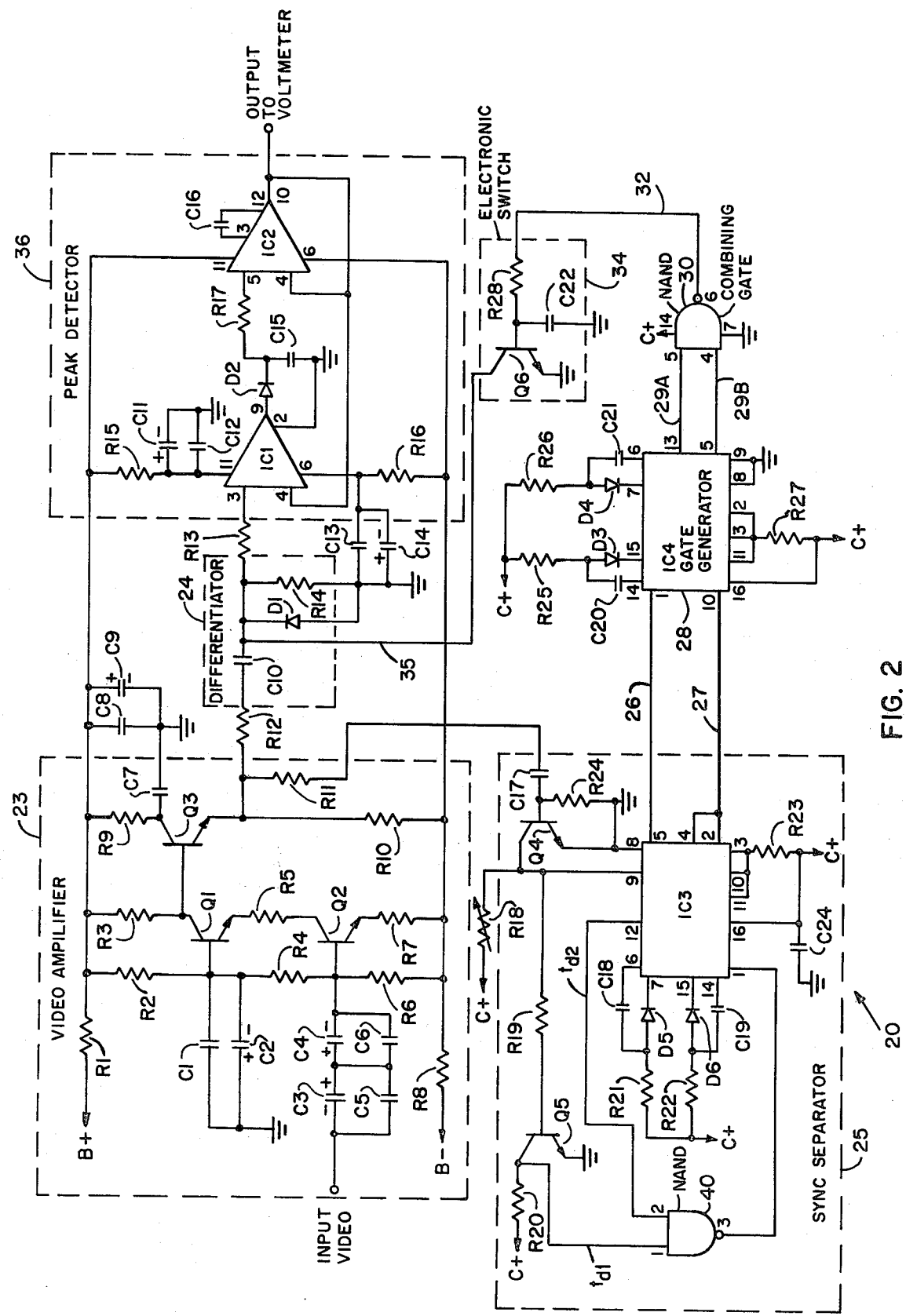
FIG. 2 is a schematic diagram of the embodiment of FIG. 1.

Referring now to the drawings wherein like numbers disclose like parts the focus meter 20 is shown in block diagram in FIG. 1. The focus meter does not use an energy measurement scheme such as that which might be employed in prior art. Instead, this meter measures the peak value of the differentiated video which lies between the video blanking pulses. This peak value is easily measured with no dynamic range problems. Any image with reasonable detail can be used to adjust system focus and the results are not subjective in nature since the technician or operator can easily read the best system focus from the meter. A TV camera 21 is directed toward a target 22 and video output electrical signals are coupled from the TV camera to the video amplifier 23.

The video passes through video amplifier 23 and is output coupled to differentiator 24 and sync separator 25. The sync separator 25 separates the vertical and horizontal synchronizing signals from the video, converts them to transistor transistor logic (TTL) compatible pulses, and stretches them to define the beginning of each gate time. The stretched sync pulses appear as horizontal and vertical output pulses on the outputs 26 and 27 respectively. These pulses trigger gate generator 28 which generates the horizontal and vertical gates as respective outputs 29A and 29B. Gate circuit 30 functions as a combining gate, combining the vertical and horizontal gates into a composite gate signal output which is coupled as a control input 32 to an electronic switch 34. Switch 34 is coupled between differentiator 24 and ground and prevents differentiated sync and blanking pulse outputs from reaching the input of a peak detector 36. The output of differentiator 24 is coupled through a resistor R13 to the input of peak detector 36. Differentiator 24 is a simple high pass filter with a 330 nanosecond time constant. This time constant is variable depending on the particular type of TV system being used, and is readily determined experimentally. The output of the differentiator is present on the electronic switch and the peak detector. Peak detector 36 is comprised of two integrated circuits which form a very fast peak detector circuit featuring low output impedance so that almost any voltmeter can be driven from the circuit. The output of the focus meter, at peak detector 36, is a direct current voltage which is related to the TV system focus. In addition to the output being coupled to a voltmeter or in lieu thereof the output signal may be coupled to an oscilloscope for visual observation of the peaks.

The focus meter works by differentiating video lying between the blanking pulses and measuring the peak value of the differentiated video. The meter produces an easily read peak voltage when the best TV system focus is obtained. The input video to the focus meter from TV 21 is standard 1 volt peak to peak video, 525 lines per frame, 60 fields per second, 2:1 interlaced with negative going sync.

In the schematic of FIG. 2 video amplifier 23 comprises Transistors Q1, Q2, and Q3 which form an inverting video amplifier with a gain of 10, a moderate input impedance (of approximately 800 ohms) and low output impedance (less than 50 ohms at 2 megahertz). Bandwidth of the amplifier with a load of approximately 1K resistance is better than 4 megahertz. Therefore the system can be used on a 875 line video input by simply changing the gating circuit time constants of integrated circuits used in the sync separator 25 and gate generator 28. Input video is coupled through a capacitor bank to the base of transistor Q2, is amplified by transistors Q1 and Q2 and coupled to the base of transistor Q3 where the output is developed on the emitter of transistor Q3 for coupling through a resister R11 to sync separator 25 and through a resister R12 to the intput of differentiator 24. Resisters R1 through R10 and capacitors C1 and C2 provide appropriate biasing for the transistors which are coupled across a power source B+ and B−, capacitors C1 and C2 being coupled between ground and the base of Q1 and capacitors C3 through C6 being coupled in series parallel between the input video signal and Q2.

Differentiator 24 comprises capacitor C10 and resister R14, with diode D1 protecting the circuit. The output from Q3 of video amplifier 23 is coupled through resister R12 to capacitor C10 of differentiator 24. The output of the differentiator is coupled through resister R13 to the input of peak detector 36 being coupled to an integrated circuit (IC1). Electronic switch 34 is coupled by way of lead 35 to the junction between capacitor C10 and resisters R13 and R14. Diode D1 is strapped across resister R14 with the anode of D1 being coupled to the ground and the cathode being coupled to the junction of lead 35. Capacitor C10 and resister R14 form a high pass filter which is an approximate differentiator at the video frequency of interest. The RC time constants of approximate 0.33 microseconds was choosen experimentally. This may be done simply by pointing the TV camera at a target and adjusting the focus to produce the sharpest picture, while displaying the camera output on an oscilloscope. The focused target pulse is displayed on the oscilloscope and the rise time of this pulse is measured. The time constant of the differentiator is then made equal to the rise time of the target pulse.

Typical inputs to differentiator 24 are shown in FIGS. 3a and 3b, with FIG. 3a showing an out of focus target pulse during one TV scan line and FIG. 3b showing the same information for a target pulse at the best focus. The rise and fall times of the best focused pulse are considerably steeper than those of the out of focus pulse. The output from differntiator 24 is shown in FIGS. 4a and 4b. These outputs are pulsed responsive to the leading edge and falling edge of the target pulse. As the leading edge becomes steeper, indicating a faster rise time and best focus, (FIG. 3b), the differentiator output is a much stronger, peaked pulse.

Peak detector 36 comprises integrated circuits 1 and 2 with appropriate biasing and coupling components the output of integrated circuit IC 1 being coupled through a diode D2 and resister R17 to integrated circuit IC 2. The output of IC 2 is coupled to provide the output to a voltmeter a oscilloscope and to provide feedback inputs to both IC2 and IC1. The output of IC1 is further coupled through diode D2 to a capacitor C15 to ground, the cathode of D2 being coupled to the capacitor. IC1, IC2, and capacitor C15 form the peak detector. The output of differentiator 24 is coupled to the non-inverting input of IC1 through R13, which is an isolating resister. IC1 is a fast comparator, having a response time of approximately 20 nanoseconds. If the peak value of the derivative output of differentiator 24 on the non-inverting input of IC1 is higher than any previous value, the output of IC1 will go HIGH (approximately 4 volt) and charge capacitor C15 through diode D2. This charge will be reflected back to the comparator IC1 inverting input, through IC2. IC2 is a high input impedance, low output impedance amplifer with a gain of 1. The output of IC1 is coupled through diode D2 and developed across capacitor C15 to ground as well as being coupled through resister R17 to an input of integrated circuit IC2. When the charge developed on capacitor C15 is several millivolts higher than the peak voltage of the derivative voltage developed at IC1 pin 3, pin 4 of IC1 will see this higher voltage as a feedback voltage from the output of IC2. At this time the output of IC1 will go low. Thus, the output of IC2 is a direct current voltage that is within several millivolts of the peak value of the derivative of the video input signal.

Sync separator 25 comprises transistor Q4 with capacitor C17 and resister R24 on its base. R24 is coupled to ground and capacitor C17 is coupled to receive an input from resistor R11 and transistor Q3 of video amplifier 23. In sync separator 25 the collector output of Q4 is coupled through a resister R19 to the base of an inverter Q5. The output of Q4 is further coupled as an input to pin 9 of an integrated circuit IC3. Q5 inverts the sync and provides a time delay $t_{d1}$ (approximately 60 nanoseconds) which is necessary because of a propagation delay $t_{d2}$, which is coupled out of pin 12 of IC3. Propagation delay $t_{d2}$ is less than $t_{d1}$, being approximately 33 nanoseconds (maximum) the outputs $t_{d1}$ and $t_{d2}$ are coupled as inputs to a NAND gate 40. The output of NAND gate 40 is coupled back to IC3 pin 1 as an input. The time delay $t_{d1}$ prevents extraneous voltage interference (glitches which are approximately 20 nanoseconds pulses) from appearing on the output of NAND gate 40. For every composite sync pulse appearing on pin 9 of IC3 a logical zero appears on pin 12 of IC3. This logical zero has a time period of $t_1$ microseconds, after which pin 12 returns to a logical 1.

If the composite sync pulse on pin 9 is a vertical sync pulse, the output of Q5 will still appear as a logical 1 input to NAND gate 40 and the output of gate 40 will go to a logical zero. This detected vertical sync is input into the second one shot multivibrator of IC3 at pin 1. The output of IC3 on pin 4 is a logical zero pulse with the tail end defining the beginning of the vertical gate. Similarly, the time period of the pulse used to detect the vertical sync is used to define the beginning of the horizontal gate (pin 5 of IC3). Pin 5 provides output 26 and pin 4 provides output 27 from the sync separator 25. Resisters R18–R23, capacitors C18–C19, and diodes D5 and D6 provide appropriate voltages and biasing for the operation of sync separator 25. The emitters of Q4 and Q5 and pin 8 of IC3 are coupled to ground.

Gate generator 28 comprises an integrating circuit IC4 identical to the integrating circuit IC3 of sync separator 25, with resisters R25–R27, capacitors C20, C21, and diodes D3 and D4 providing appropriate biasing for IC4. Pins 1 and 10 of IC4 receive respectively outputs 26 and 27 from sync separator 25. Pins 5 and 13 of IC4 provide the outputs 29 of gate generator 28, these outputs being coupled as respective inputs to a NAND gate which is combining gate 30. The output of NAND gate 30, output 32, is coupled as an input to an electronic switch 34. Electronic switch 34 comprises a transister Q6 having the emitter coupled to ground and the base coupled through a capacitor C22 to ground and through a resister R28 to receive the input from lead 32. The collecter of Q6 is coupled as output lead 35 to differentiator 24 for providing a path from capacitor C10 of differentiator 24 through Q6 to ground when the electronic switch is on.

IC3 and IC4 are dual retriggerable monostable multivibrators with clear. The beginning signal of the horizontal gate output at pin 5 of IC3 and the beginning signal of the vertical gate output at pin 4 of IC3 are routed respectively to pins 1 and 10 of IC4. IC4 outputs the horizontal and vertical gates on pins 13 and 5 respectively. These signals are combined by NAND gate 30 into a composite gate signal and used to drive blanking transistor Q6 (electronic switch 34). These gating signals are required since, for some actual video signals, the derivative of the sync and blanking signals are often of higher magnitude than the derivative of the video. Thus they must be blanked out.

In operation, the sensing device (camera or FLIR) is pointed at a target, and the focus ring or other focusing means of the sensing device is varied into or through the focus range. Video input to implifier 23 is amplified and coupled to differentiator 24. The output of differentiator 24 is coupled through resister R13 to peak detector 36 and subsequently is an output to the voltmeter or other indicating circuitry. The peak voltage reading varies considerably depending on the target under observation. The peak value of the derivative voltage also changes noticably as the input signal comes into focus. The sync separator separates the vertical and horizontal synchronizing signals from the video, converts them to TTL compatible pulses, and stretches them to define the beginning of each gate time. These stretched sync pulses trigger the gate generator which generates the horizontal and vertical gates, outputs 29A and 29B respectively. These signals are combined in combining gate 30 providing a composite gate output signal which functions as a control signal for electronic switch Q6. This switch operates intermittently to prevent differented sync and blanking pulses appearing at the output of the differentiator from reaching the input of the peak detector. Thus only desired output signals reach the peak detector allowing the detector to respond only to the input video signals.

Figure 5:
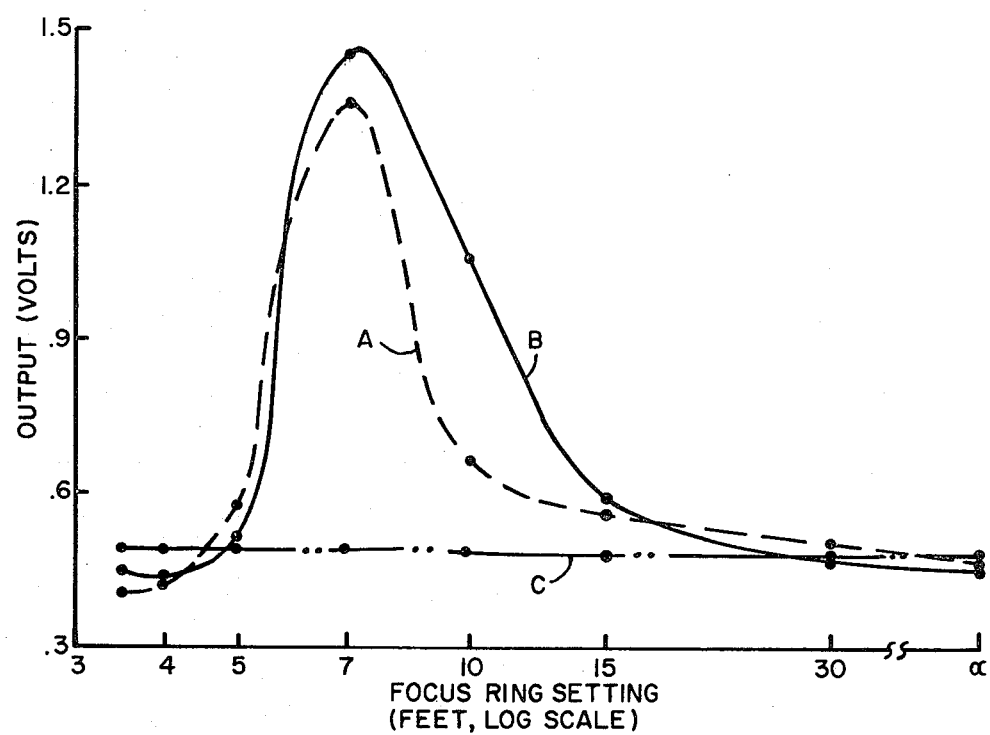
FIGS. 5 and 6 are graphs of the focus meter output response in voltage as the focus meter responds to changes in focus.
Figure 6:
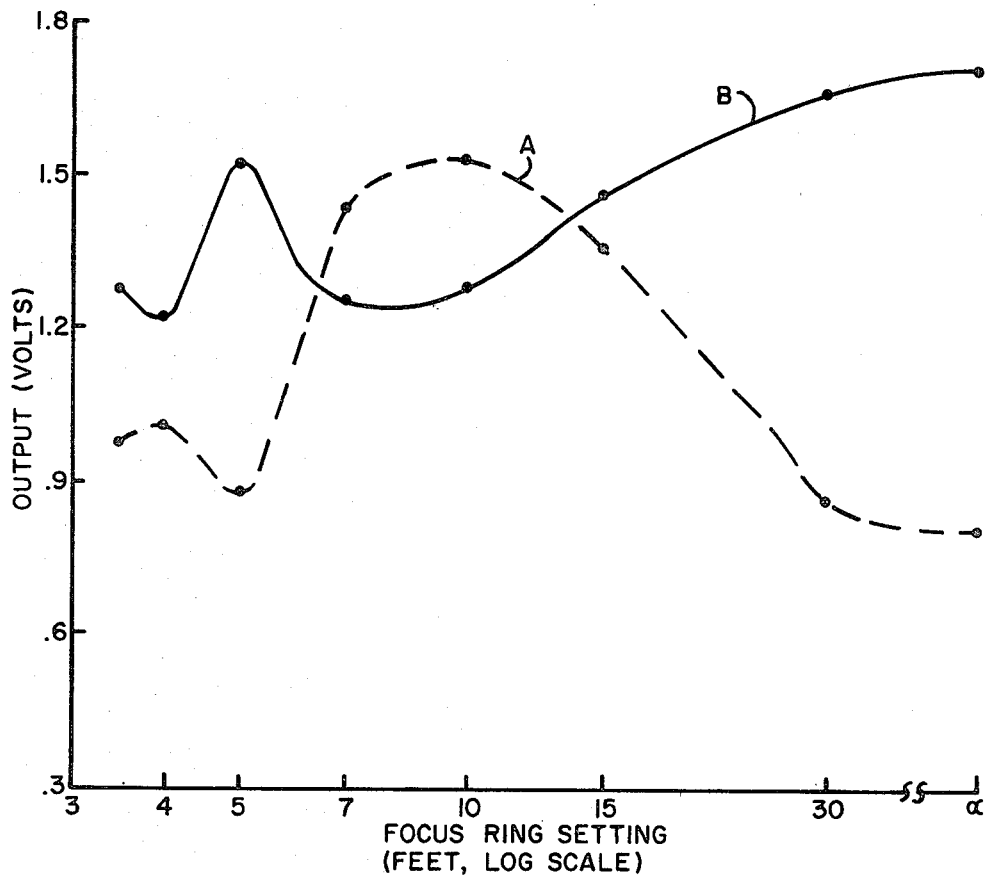

Typical transfer curves taken with the focus meter are shown in FIGS. 5-6. These curves were taken with a TV camera having an F/1.8, 75 mm focal length lens. The curves were taken by pointing the camera at the target, varying the focus ring, and recording the voltage on pin 10 of IC2. The peak voltage readings vary considerably depending on the target under observation. In FIG. 5, curve A shown in dash lines is the response to video input of a table vise target at 7 feet from the TV camera. The solid line curve B is the output response to a resolution board target located at 7 feet from the camera. The vertical coordinate is the output of the voltmeter in volts and the horizontal coordinate is the distance in focal length of the camera pointed toward the target, using the log scale. Curve C is the output recorded for cabinet drawers at 3 feet and 6 feet from the camera. The flat curve of FIG. 5, curve C, indicates close proximity of the camera to a target having almost no features on which to focus. Thus the meter read the peak noise in the video system. In FIG. 6 curve A represents a resolution board target located 10 feet from the camera. Curve B is a more complex curve wherein the operator is within a room looking through a window at a building in the distance. At the focus ring setting of approximately 5 feet the peak in the curve indicates focus of the camera on the window screen. As the distance on the focus ring setting increases the output drops rapidly and then slowly climbs as the building located at infinity on the focus ring setting comes into focus.

For curve A of FIG. 6 the low peak at about 4 feet and the high peak at about 10 feet appear to indicate two targets also. However, there was only one target involved. This phenomena is related to the modulation transfer function (MTF) of the camera lens. The output of the volt meter is dependent on the MTF of the optics and the spatial frequency content of the target. It appears that targets containing certain predominant spatial frequencies can cause secondary peaks such as the peak at the 4 foot focal length position in FIG. 6. However, regardless of this false peak, it is readily apparent from the curve that peaks caused by the target being in focus are greater than these secondary peaks which might occasionally occur. The MTF of a lens in the presence of defocusing is discussed in detail in Applied Optics Volume I, Leo Levi, published by John Wiley and Sons, 1968, as noted at pages 444-445.

The very fast peak detector and the RC high pass filter (differentiator) provide the heart of the operation of the meter. For targets of normal spatial frequency content the highest meter reading does correspond to best focus. The circuit can be changed to work with other line systems such as the 875 line system simply by varying the RC time constants associated with IC3 and IC4 to properly control the gate times and thereby prevent differentiated sync and blanking pulses from appearing at the output of the differentiator.

The focus meter may be built utilzing standard off the shelf items. For example, the TV camera may be a typical Sony TV camera with an F1.8, 75 mm focal length lens. Video amplifier 23 differentiator 24, sync separator 25, gate generator 28, gate 30, switch 34, and peak detector 36 may be comprised of the following typical components.

| COMPONENT | SHELF ITEM |
| --- | --- |
| IC1 | µA710F(Signetics) |
| IC2 | LM101 AF (Signetics) |
| IC3 & IC4 | DM54123 (National) |
| NAND gates 30 & 40 | 5400 (Motorola) |
| D1-D6 | IN914 |
| Q1 & Q2 | 2N3904 |
| Q3 | 2N2270 |
| Q4 | 2N3391 |
| Q5 & Q6 | 2N2222 |
| C1, C5, C6, C7, C8, C12, C13 | .01 microfarad |
| C20 & C24 | .01 microfarad |
| C2, C3, C4, C9, C11 & C14 | 15 microfarad |
| C10 | 150 picofarad |
| C15 | .15 microfarad |
| C16 | 33 picofarad |
| C17 & C19 | .47 microfarad |
| C18 | .0068 microfarad |
| C21 | 3 microfarad |
| C22 | .002 microfarad |
| R1, R8 & R9 | 10 ohms |
| R2 | 12.1K ohms |
| R3 & R16 | 2K ohms |
| R4 | 3.57K ohms |
| R5 & R12 | 100 ohms |
| R6 | 1.1K ohms |
| R7 | 150 ohms |
| R10 | 680 ohms |
| R11, R13, R14, R17, R18, & R19 | 2.2K ohms |
| R20, R23, R27, & R28 | 2.2K ohms |
| R15 | 330 ohms |
| R21 | 7.5K ohms |
| R22 | 18K ohms |
| R24 | 68.1K ohms |
| R25 | 15K ohms |
| R26 | 16K ohms |

Although a particular embodiment and form of the invention has been described, it will be obvious to those skilled in the art that modification may be made without departing from the scope and spirit of the invention.

For example, the component values listed for the particular components need not necessarily be restricted to the particular value given. For example R18 is shown as being 2.2 K a 1 K resister will also work. Obviously R18 could very well be a potentiometer if space permits. Accordingly, it is understood that the invention is limited only by the claims appended hereto.

I claim:

1. A focus meter comprising a video amplifier, a differentiator, a peak detector, and switching means, said video amplifier being adapted for receiving a video frequency input signal and providing an output in response thereto, said differentiator being adapted for receiving the output of said video amplifier and for providing a differentiated output signal in response thereto, said peak detector being adapted for receiving an output signal from said differentiator and for providing an output signal indicative of the level of focus of said input signal, and said switching means being coupled between said differentiator and a system ground for selectively short-circuiting unwanted interference signals to ground and thereby allowing only acceptable video pulses to be passed to said peak detector.

2. A focus meter as set forth in claim 1 and further comprising gating means having an input coupled to said video amplifier output and an output coupled to said switching means for detecting undesirable signals in the output of said video amplifier and gating said switching means in response thereto.

3. A focus meter as set forth in claim 2 wherein said gating means comprises a sync separator having an input coupled to the output of said video amplifier and having horizontal and vertical output stages, a gate generator having first and second inputs adapted to receive outputs from said first and second output stages of said sync separator and said gate generator having horizontal and vertical signal outputs, and a combining gate having inputs adapted to receive said horizontal and vertical signal outputs of said gate generator for providing a combined gate output signal to said switching means and said switching means being an electronic switch having a control input coupled to said combining gate output for activating and deactivating said electronic switch.

4. A focus meter as set forth in claim 3 wherein said differentiator comprises a resistance capacitance filter, the output of said video amplifier being coupled as the input to said capacitance, said resistance being coupled between a system ground and the other side of said capacitance and a resister coupled to the junction between said resistance and capacitance for providing an output signal therethrough to said peak detector input.

5. A focus meter as set forth in claim 4 wherein said peak detector comprises first and second integrated circuits coupled in series for responding to the output of said differentiator, said first integrated circuit being a single comparator having first and second inputs and an output, and said second integrated circuit being a general purpose operational amplifier having first and second inputs and an output, the output of said operational amplifier being coupled as said focus meter output and further providing feedback to the second inputs of said comparator and said operational amplifier, said first input of said comparator being adapted for receiving the output of said differentiator and said first input of said operational amplifier being adapted for receiving the output of said comparator.

6. A focus meter as set forth in claim 5 wherein said peak detector further comprises a diode having the anode coupled to the output of said comparator, a capacitor having one side coupled to ground and the other side coupled to the cathode of said diode and a resister coupled between the cathode of said diode and said operational amplifier first input.

7. A focus meter as set forth in claim 6 wherein said sync separator comprises a sync circuit, an inverter, a dual retriggerable monostable multivibrator circuit, and a two input NAND gate, said sync circuit being adapted for receiving the output of said video amplifier and for providing an output therefrom to said inverter and to said monostable multivibrator circuit, an output from said inverter being coupled as a first input to said NAND gate and a first output from said monostable multivibrator circuit being coupled as a second input to said NAND gate, said NAND gate having an output coupled as a second input to said monostable multivibrator circuit for initiating first and second separate and distinct outputs from said monostable multivibrator circuit as said sync separater output.

8. A focus meter as set forth in claim 7 wherein said gate generator is a dual retriggerable monostable multivibrator having first and second inputs corresponding to said first and second inputs of said sync separator monostable multivibrator circuit for providing first and second gate generator outputs in response to inputs from said snyc separator, and wherein said combining gate is a NAND gate having first and second inputs adapted to receive said first and second gate generator outputs and having an output coupled to said electronic switch for selectively gating said switch.

* * * * *